(12) United States Patent
Voronov (10) Patent No.: US 9,380,229 B2
(45) Date of Patent: Jun. 28, 2016

(54) DIGITAL IMAGING SYSTEMS INCLUDING IMAGE SENSORS HAVING LOGARITHMIC RESPONSE RANGES AND METHODS OF DETERMINING MOTION

(71) Applicant: Samsung Electronics Co., Ltd., Suwon-Si, Gyeonggi-Do (KR)

(72) Inventor: German Voronov, Ramat Gan (IL)

(73) Assignee: SAMSUNG ELECTRONICS CO., LTD., Gyeonggi-do (KR)

( * ) Notice: Subject to any disclaimer, the term of this patent is extended or adjusted under 35 U.S.C. 154(b) by 125 days.

(21) Appl. No.: 14/193,051

(22) Filed: Feb. 28, 2014

(65) Prior Publication Data

US 2015/0249796 A1    Sep. 3, 2015

(51) Int. Cl.
*H04N 5/355*    (2011.01)
*H04N 5/232*    (2006.01)

(52) U.S. Cl.
CPC ....... *H04N 5/35581* (2013.01); *H04N 5/23229* (2013.01); *H04N 5/23254* (2013.01); *H04N 5/23277* (2013.01)

(58) Field of Classification Search
CPC .......... H04N 5/23229; H04N 5/23254; H04N 5/23277; H04N 5/35527; H04N 5/35554; H04N 5/3535
See application file for complete search history.

(56) References Cited

U.S. PATENT DOCUMENTS

| | | | |
|---|---|---|---|
| 6,879,731 B2 | 4/2005 | Kang et al. | |
| 7,190,399 B2 * | 3/2007 | Kakumoto | H04N 5/35518 348/297 |
| 7,295,237 B2 * | 11/2007 | Kusuda | H04N 3/155 348/297 |
| 7,548,689 B2 | 6/2009 | Yap et al. | |
| 7,667,764 B2 * | 2/2010 | Kamon | H04N 5/235 348/364 |
| 7,777,804 B2 | 8/2010 | Shan et al. | |
| 8,009,206 B2 * | 8/2011 | Masaki | H04N 5/23225 348/222.1 |
| 8,224,176 B1 * | 7/2012 | Pillman | H04N 5/23248 348/364 |
| 8,237,813 B2 | 8/2012 | Garten | |
| 8,280,107 B2 * | 10/2012 | Kmiecik | G01C 11/00 348/42 |
| 8,405,750 B2 * | 3/2013 | Smith | H04N 5/235 348/308 |
| 9,105,097 B2 * | 8/2015 | Rous | G06T 7/20 |
| 2004/0046101 A1 * | 3/2004 | Nakamura | H04N 5/35527 250/200 |
| 2004/0125221 A1 * | 7/2004 | Kakumoto | H04N 5/35518 348/243 |

(Continued)

FOREIGN PATENT DOCUMENTS

JP    2010130408 A    6/2010

OTHER PUBLICATIONS

Smart Readout Technique designed for Logarithmic CMOS Image Sensor Including a Motion Detection Scheme, Amhaz et al, IEEE, 2011.*

(Continued)

*Primary Examiner* — Nicholas Giles
(74) *Attorney, Agent, or Firm* — Harness, Dickey & Pierce, P.L.C.

(57) ABSTRACT

In at least one example embodiment, a method of determining motion in an image includes acquiring pixel data from a plurality of pixels in an image sensor, the plurality of pixels having respective response ranges, the response range of at least a first pixel of the pixels including a linear response range and a logarithmic response range, the plurality of pixels configured to produce pixel data according to light of the image in a scene and the response ranges and determining the motion based on the pixel data generated across the response ranges including the logarithmic response range of the at least first pixel.

10 Claims, 6 Drawing Sheets

(56) References Cited

U.S. PATENT DOCUMENTS

| | | | | |
|---|---|---|---|---|
| 2005/0012838 A1* | 1/2005 | Kusuda | ............... | H04N 3/155 348/308 |
| 2005/0270412 A1* | 12/2005 | Kamon | ............... | H04N 5/235 348/362 |
| 2008/0164985 A1* | 7/2008 | Iketani | ............... | G01S 7/4802 340/435 |
| 2008/0199050 A1* | 8/2008 | Koitabashi | ............... | B60R 1/00 382/107 |
| 2009/0141139 A1* | 6/2009 | Takahashi | ............... | H04N 5/23293 348/222.1 |
| 2009/0174799 A1* | 7/2009 | Lee | ............... | H04N 5/361 348/294 |
| 2010/0141819 A1* | 6/2010 | Fowler | ............... | H01L 27/14609 348/302 |
| 2010/0157078 A1 | 6/2010 | Atanassov et al. | | |
| 2010/0166256 A1* | 7/2010 | Kmiecik | ............... | G01C 11/00 382/103 |
| 2010/0309333 A1* | 12/2010 | Smith | ............... | H04N 5/235 348/230.1 |
| 2011/0019014 A1 | 1/2011 | Oh et al. | | |
| 2011/0069200 A1 | 3/2011 | Oh et al. | | |
| 2012/0268632 A1* | 10/2012 | Kamon | ............... | H04N 5/2351 348/294 |
| 2012/0274822 A1* | 11/2012 | Smith | ............... | H04N 5/23254 348/302 |
| 2012/0305751 A1* | 12/2012 | Kusuda | ............... | H04N 5/35509 250/208.1 |
| 2012/0321133 A1* | 12/2012 | Rous | ............... | G06T 7/20 382/103 |
| 2015/0036005 A1* | 2/2015 | Kelly | ............... | H04N 5/2355 348/208.1 |

OTHER PUBLICATIONS

Nayar et al., High Dynamic Range Imaging: Spatially Varying Pixel Exposures, CVPR 2000 vol. 1, pp. 472-479 (Jun. 13-15, 2000).

* cited by examiner

DIGITAL IMAGING SYSTEMS INCLUDING IMAGE SENSORS HAVING LOGARITHMIC RESPONSE RANGES AND METHODS OF DETERMINING MOTION

BACKGROUND

An image sensor converts an optical image into an electrical signal. Types of image sensors include charge-coupled devices (CCDs) and complementary-metal-oxide-semiconductor (CMOS) image sensors. Image sensors are commonly used in digital cameras as well as other imaging devices.

Image sensors include pixels, which accumulate charge when illuminated by light. Conventionally, pixels accumulate charge in an analog circuit for a continuous period of time referred to as an exposure time. The accumulated charge is transferred to an analog-to-digital (A/D) converter (ADC), which converts the accumulated charge into a digital value for that pixel. A conventional image sensor outputs a two-dimensional (2D) array of digital values.

In CMOS image sensors, exposure of all pixels in a same row starts simultaneously and ends simultaneously. In other image sensors, exposures of all pixels may start at the same time, but end at different times.

What is common to conventional image sensors is that the digital value of a pixel is obtained as a result of A/D conversion of a charge that was accumulated during a continuous time interval of exposure.

High-dynamic-range imaging has recently been developed which takes multiple pictures at different exposures. The different exposures are then combined to produce an image.

SUMMARY

Example embodiments disclose methods and/or systems of employing properties of an image sensor to reduce potential artifacts of ghosting or deformations in high dynamic range imaging (HDR). In an example embodiment, a logarithmic pixel range is used to determine motion between frames. In another example embodiment, sparse mosaic patterns are used to determine motion between frames.

In at least one example embodiment, a method of determining motion in an image includes acquiring pixel data from a plurality of pixels in an image sensor, the plurality of pixels having respective response ranges, the response range of at least a first pixel of the pixels including a linear response range and a logarithmic response range, the plurality of pixels configured to produce pixel data according to light of the image in a scene and the response ranges and determining the motion based on the pixel data generated across the response ranges including the logarithmic response range of the at least first pixel.

In an example embodiment, the first pixel is associated with a first exposure frame and at least a second pixel of the pixels is associated with a second exposure frame, the first exposure frame and the second exposure frame being different.

In an example embodiment, the first exposure frame is longer than the second exposure frame.

In an example embodiment, the method further includes combining the pixel data from the first pixel with the pixel data from the second pixel based on the determining the motion.

In an example embodiment, the method further includes removing pixel data from the first pixel based on the determining the motion and determining the image based on the remaining pixel data.

At least one example embodiment discloses an image sensor including a plurality of pixels, the image sensor configured to acquire pixel data from the plurality of pixels, the plurality of pixels having respective response ranges, the response range of at least a first pixel of the pixels including a linear response range and a logarithmic response range, the plurality of pixels configured to produce pixel data according to light of an image in a scene and the response ranges and a processor configured to determine motion of the image based on the pixel data generated across the response ranges including the logarithmic response range of the at least first pixel.

In an example embodiment, the first pixel is associated with a first exposure frame and at least a second pixel of the pixels is associated with a second exposure frame, the first exposure frame and the second exposure frame being different.

In an example embodiment, the first exposure frame is longer than the second exposure frame.

In an example embodiment, the processor is configured to combine the pixel data from the first pixel with the pixel data from the second pixel based on the determined motion.

In an example embodiment, the processor is configured to remove the pixel data from the first pixel based on the determined motion and determine the image based on the remaining pixel data.

At least one example embodiment discloses a method including acquiring first pixel data from a first plurality of pixels in an image sensor over a first exposure time, acquiring second pixel data from a second plurality of pixels in an image sensor over a second exposure time, a number of the second plurality of pixels being less than a number of the first plurality of pixels and the second exposure time being different than the first exposure time and determining the motion based on at least one of the acquired first and second pixel data.

In an example embodiment, the method further includes compensating for the second pixel data after the determining the motion.

In an example embodiment, the second exposure time is less than the first exposure time.

In an example embodiment, the first exposure time is less than the second exposure time.

In an example embodiment, the method further includes changing the second plurality of pixels.

At least one example embodiment discloses an imaging system including an image sensor having a plurality of pixels, the image sensor configured to acquire first pixel data from a first plurality of pixels in the image sensor over a first exposure time and acquire second pixel data from a second plurality of pixels in an image sensor over a second exposure time, a number of the second plurality of pixels being less than a number of the first plurality of pixels and the second exposure time being different than the first exposure time and a processor configured to determine motion of the image based on at least one of the acquired first and second pixel data.

In an example embodiment, the processor is configured to compensate for the second pixel data after the determining the motion.

In an example embodiment, the second exposure time is less than the first exposure time.

In an example embodiment, the first exposure time is less than the second exposure time.

In an example embodiment, the processor is configured to change the second plurality of pixels.

BRIEF DESCRIPTION OF THE DRAWINGS

Example embodiments will become more apparent and readily appreciated from the following description of the drawings in which.

DETAILED DESCRIPTION

Example embodiments will now be described more fully with reference to the accompanying drawings. Many alternate forms may be embodied and example embodiments should not be construed as limited to example embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, a processor or processors will perform the necessary tasks.

A processor and a memory may operate together to run apparatus functionality. For example, the memory may store code segments regarding apparatus functions. The code segments may in-turn be executed by the processor. Further, the memory may store process variables and constants for use by the processor.

Example embodiments will be described herein with reference to complementary metal oxide semiconductor (CMOS) image sensors (CIS); however, those skilled in the art will appreciate that example embodiments are applicable to other types of image sensors.

Specific details are provided in the following description to provide a thorough understanding of example embodiments. However, it will be understood by one of ordinary skill in the art that example embodiments may be practiced without these specific details. For example, systems may be shown in block diagrams in order not to obscure the example embodiments in unnecessary detail. In other instances, well-known processes, structures and techniques may be shown without unnecessary detail in order to avoid obscuring example embodiments.

In example embodiments high and low logic states may be referred to as one and zero, respectively, but should not be limited thereto.

Example embodiments disclose a methodology to construct color images of high dynamic range (HDR) from multiple input images of a low dynamic range (LDR) sensor, e.g. the construction of a 100 dB image using a sensor with 60 dB dynamic range.

In order to produce a high quality HDR image from several LDR images, local motion compensation is used to eliminate potential artifacts of ghosting or deformations.

Figure 1:
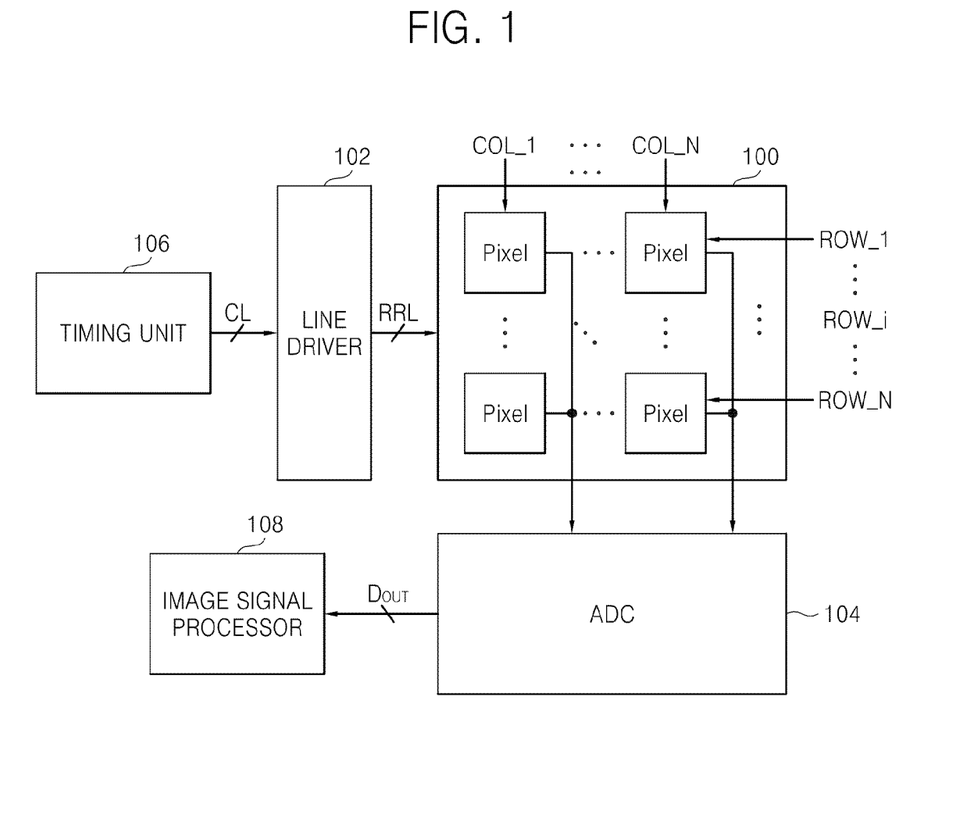
FIG. 1 is a block diagram of an image sensor according to an example embodiment.

FIG. 1 illustrates a complementary-metal-oxide-semiconductor (CMOS) image sensor according to an example embodiment.

Referring to FIG. 1, a timing unit or circuit 106 controls a line driver 102 through one or more control lines CL. In one example, the timing unit 106 causes the line driver 102 to generate a plurality of transfer pulses (e.g., readout, shutter and/or anti-blooming shutter pulses). The line driver 102 outputs the transfer pulses to a pixel array 100 over a plurality of read and reset lines RRL.

The pixel array 100 includes a plurality of pixels arranged in an array of rows ROW_1-ROW_N and columns COL_1-COL_N. As discussed herein, rows and columns may be collectively referred to as lines. Each of the plurality of read and reset lines RRL corresponds to a line of pixels in the pixel array 100. In FIG. 1, each pixel may be an active-pixel sensor (APS), and the pixel array 100 may be an APS array.

Although example embodiments may be discussed herein with regard to lines (e.g., rows and/or columns) of a pixel array, it should be understood that the same principles may be applied to pixels grouped in any manner.

In more detail with reference to example operation of the image sensor in FIG. 1, transfer pulses for an i-th line ROW_i (where i={1, . . . , N}) of the pixel array 100 are output from the line driver 102 to the pixel array 100 via an i-th one of the read and reset lines RRL. In one example, the line driver 102 applies a shutter transfer pulse to the i-th line ROW_i of the pixel array 100 to begin an exposure period (integration time). After a given, desired or predetermined exposure time, the line driver 102 applies a readout transfer pulse to the same i-th line ROW_i of the pixel array 100 to end the exposure period.

The application of the readout transfer pulse also initiates reading out of pixel information (e.g., exposure data) from the pixels in the i-th line ROW_i.

The analog-to-digital converter (ADC) 104 converts the output voltages from the i-th line ROW_i of readout pixels into a digital signal (or digital data). The ADC 104 may perform this conversion either serially or in parallel. An ADC 104 (e.g., having a column parallel-architecture) converts the output voltages into a digital signal (e.g., in parallel). The ADC 104 then outputs the digital data (or digital code) $D_{OUT}$ to a next stage processor such as an image signal processor (ISP) 108, which processes the digital data $D_{OUT}$ to generate an image. In one example, the ISP 108 may also perform image processing operations on the digital data including, for example, gamma correction, auto white balancing, application of a color correction matrix (CCM), and handling chromatic aberrations.

Figure 2:
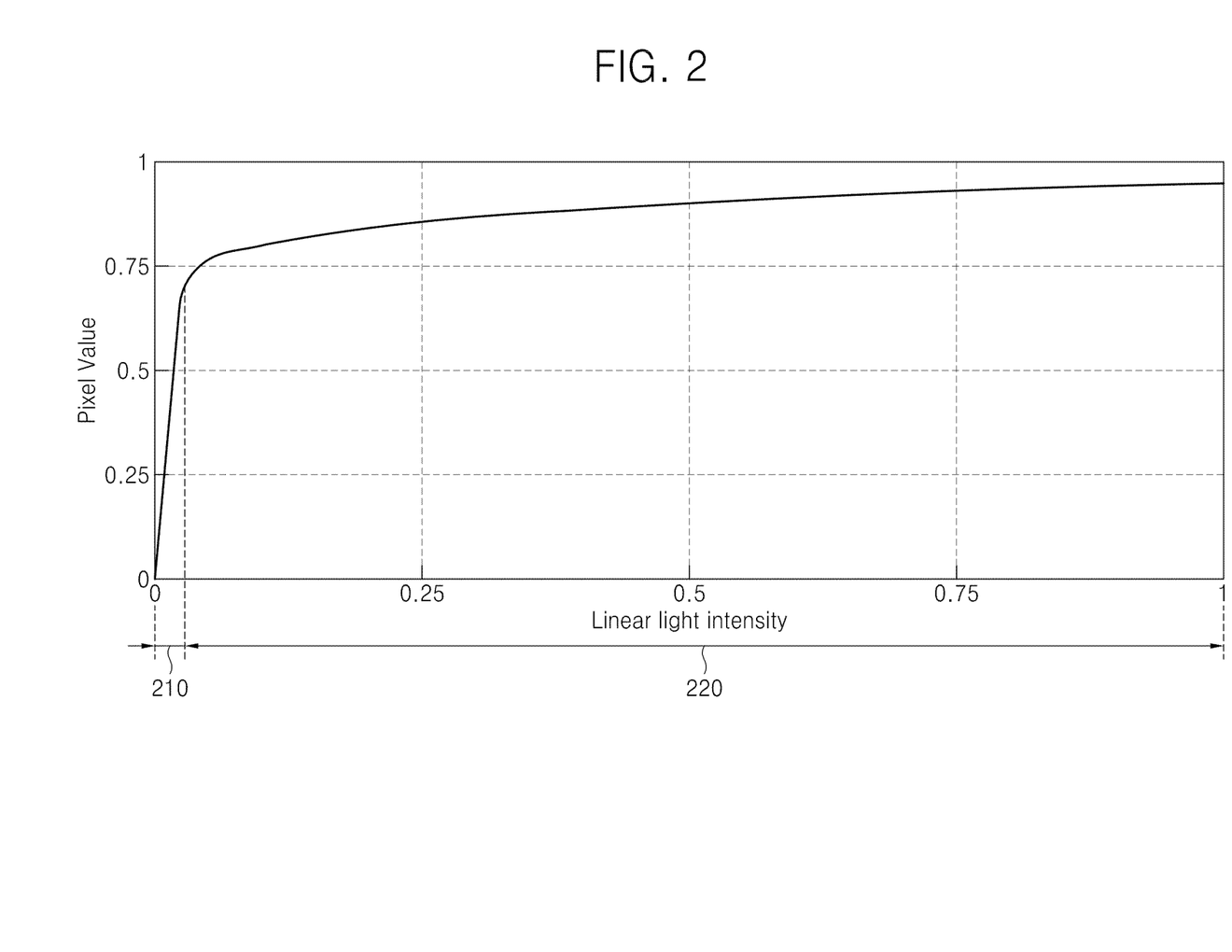
FIG. 2 illustrates response range of a pixel according to an example embodiment.

FIG. 2 illustrates the response range of a pixel. The pixel may be any of the pixels in the pixel array 100.

As shown in FIG. 2, the pixel includes a linear response range 210 (linear relationship between light intensity and pixel value) and a logarithmic response range 220.

Conventionally, image sensors are configured to use the linear range of pixel response only. The logarithmic response range would be discarded. Values in the logarithmic response range are clipped to a maximum value of the linear range. The logarithmic response range 220 is generally noisier than the linear response range 210 and is not always usable for an actual image.

Pixel values that reach the logarithmic range were considered saturated regardless of whether the exposure is long or short (this depends on the combination between scene luminance and exposure time). A scene with much light, such as sun-lit skies, is likely to saturate even at short exposures. A longer exposure would be more likely to contain saturated pixels. Any pixel saturated in a short exposure will surely be saturated in a longer exposure. The proposed method is useful in situations when the long exposure is in the logarithmic range but the short exposure is in the linear range. Therefore, in a long-exposure frame, the regions that were out of the linear range of the pixel were considered to be saturated.

Figure 3:
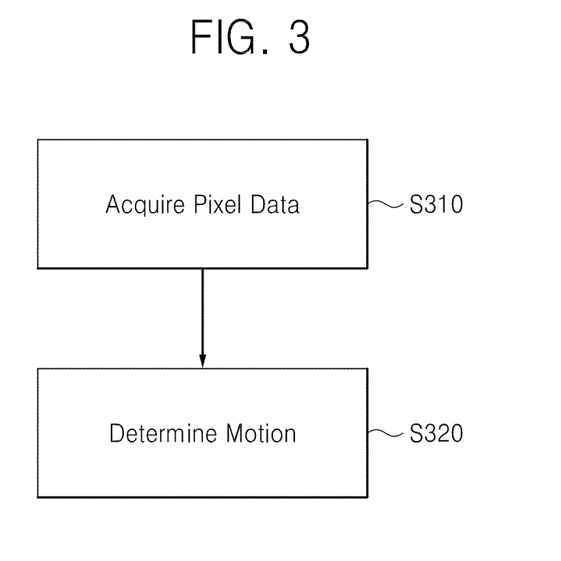
FIG. 3 illustrates a method of determining motion in an image, according to an example embodiment.

FIG. 3 illustrates a method of determining motion in an image, according to an example embodiment. The method of FIG. 3 may be performed by the image sensor shown in FIG. 1, for example.

At S310, the image sensor acquires pixel data from the plurality of pixels in the image sensor to generate an image. The plurality of pixels have respective response ranges. For example, the plurality of pixels have logarithmic and linear response ranges. The pixel data represents light acquired from an object over and exposure time.

At S320, the image sensor (e.g., the processor 108) determines the motion in the image based on the pixel data generated across the response ranges, including the logarithmic response ranges.

When the logarithmic range of the pixel response is used, these regions include lower quality details of the scene that are applicable to obtain the correspondence between the images of different exposures. That way, additional information contained in the logarithmic part of the pixel response adds information to eliminate aforementioned artifacts.

This may be performed after the image signal processor processes the image or as part of the image signal processor pipeline. The data from the logarithmic range may be used as follows: when a long exposure pixel in the first frame reaches the logarithmic range, and the corresponding short-exposure pixel in the second frame is in the linear range, those values may be compared for determining whether they are consistent. The corresponding short-exposure pixel may be either the exact same pixel or, if motion between frames was determined, then each pixel has an offset vector saying where the pixel moved to in the second frame (for example, when the camera moved between frames). In the latter case, the corresponding pixel is the pixel after motion was compensated. If values are not consistent, the processor determines there was motion in this area of the scene. The processor is configured to merge the two frames when there is not motion and process the two frames differently when motion is detected. The algorithm that merges the 2 frames processes regions with motion differently than regions where motion was not detected. When motion is detected, conventional algorithms such as image completion (filling in regions of an image where data is missing) can be used.

The quality of an HDR picture can be improved by testing the motion presence hypothesis (whether the object is exactly at the same location in both frames). In other words, based on known exposure times and the graph in FIG. 2, the processor is configured to infer light intensity values from the pixel data. The processor compares the light intensity between the two frames and if it is inconsistent between the frames, the processor determines there was motion.

When no motion is detected, the region is merged using both frames. For example, a typical scenario includes two (or more) frames with two (or more) exposure times. On the other hand, when there is potential motion, only one frame out of two represents this region in the final picture without introducing unwanted artifacts. In an example, one of the frames is preselected by the processor to be the reference frame. This frame is used by the processor when motion is detected.

Figure 4:
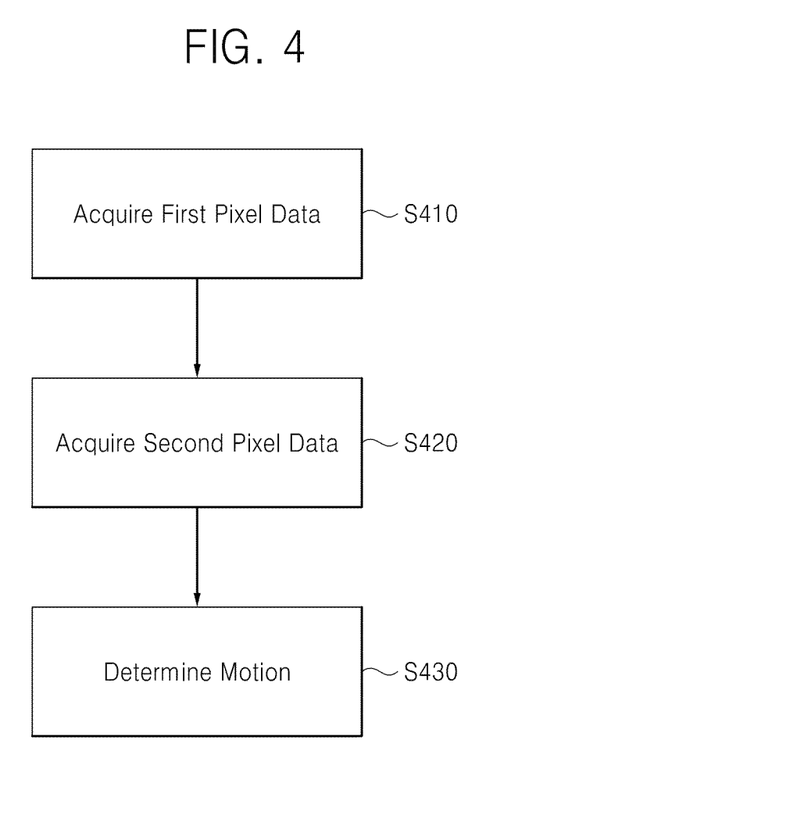
FIG. 4 illustrates a method of determining motion in an image according to another example embodiment.

FIG. 4 illustrates a method of determining motion in an image according to another example embodiment.

One of the conventional approaches to obtain an HDR image is to take a single image with part of the pixels having a long exposure, while the other part has a short exposure. The pattern of an image sensor with pixels for a long exposure and other pixels for a short exposure may be referred to as a mosaic. Such an approach is described in Nayar et al., *High Dynamic Range Imaging: Spatially Varying Pixel Exposures*, CVPR 2000 vol. 1, pp. 472-479 (Jun. 13-15, 2000). The approach mitigates ghosting and other content change related artifacts as the two exposures overlap and the time difference is lessen, compared to a multiple frame approach.

However, conventional mosaic based HDR has reduced resolution, only part of the pixels represent long or short exposure information. Moreover, conventional mosaic based HDR has a small extension of dynamic range and boundary artifacts. Only two different exposures are used in each capture. Increasing image partitioning into different exposures leads to further deterioration of the resolution. Using a high long-to-short exposure ratio results in an SNR (signal-to-noise ratio) dip that reduces the quality of the HDR result. False colors and crosstalk related artifacts may appear in the regions where long exposure pixels are in saturation.

The inventors have discovered that a sparse mosaic approach combined with multiple exposure HDR composition reduces mosaic related artifacts and multiple exposure artifacts.

Figure 5A:
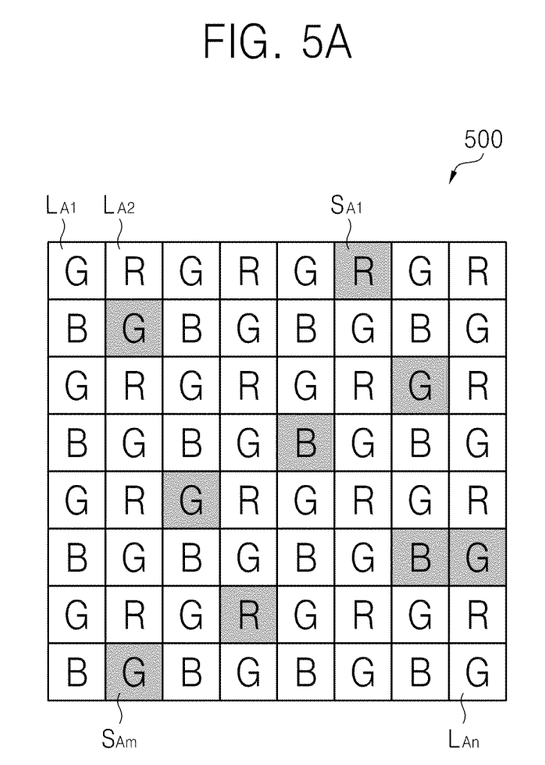
FIG. 5A illustrates a sparse mosaic pattern according to an example embodiment.
Figure 5B:
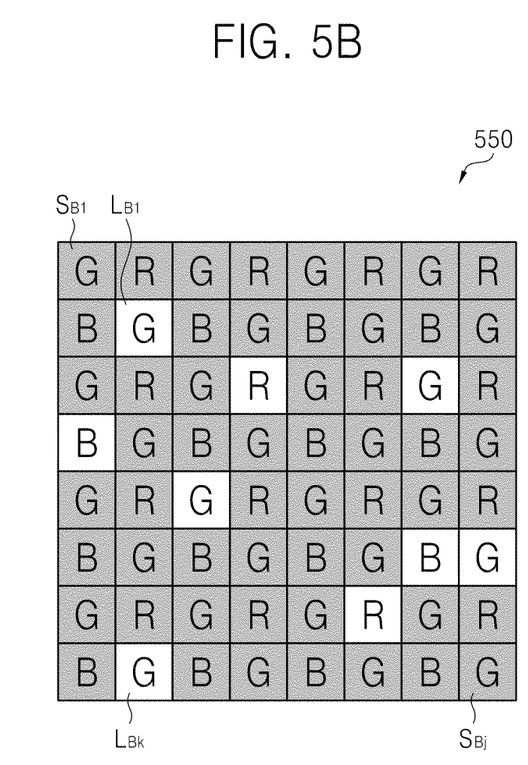
FIG. 5B illustrates a sparse mosaic pattern according to another example embodiment.

FIGS. 5A and 5B illustrate sparse mosaic patterns according to example embodiments.

FIG. 5A illustrates a sparse mosaic pattern 500. Conventional methods use a pixel ratio (number of pixels with one exposure to number of pixels with another exposure) such as 1:1 between differing exposures. In example embodiments, sparse may refer to a ratio of 1:4 and less (1:8, 1:32, 1:256, etc.).

As shown, the sparse mosaic pattern 500 is arranged in a Bayer pattern. As is known, in a Bayer pattern layout, each pixel contains information that is relative to only one color component, for example, Red, Green or Blue. Generally the Bayer pattern includes a green pixel in every other space and, in each row, either a blue or a red pixel occupies the remaining spaces. To obtain a color image from a typical image sensor, a color filter (e.g., Bayer filter) is placed over sensitive elements of the sensor (e.g., pixel). The individual sensors are only receptive to a particular color of light, red, blue or green. The final color picture is obtained by using a color interpolation algorithm that joins together the information provided by the differently colored adjacent pixels.

The sparse mosaic pattern 500 represents a long exposure frame with a sparse, short exposure mosaic. The sparse mosaic pattern 500 is referred to a long exposure frame because the pattern 500 consists mostly of long exposure pixels. The lighter colored pixels $L_{A1}$-$L_{An}$ are used for a long exposure and the darker colored pixels $S_{A1}$-$S_{Am}$ are used for a short exposure. The long exposure is longer than the short exposure.

FIG. 5B illustrates a sparse mosaic pattern 550. As shown, the sparse mosaic pattern 550 is arranged in a Bayer pattern. The sparse mosaic pattern 550 represents a short exposure frame (i.e., consists mostly of short exposure pixels) with a sparse long exposure mosaic. The darker colored pixels $S_{B1}$-$S_{Bj}$ are used for a short exposure frame and the lighter colored pixels $L_{B1}$-$L_{Bk}$ are used for a long exposure frame.

In an example embodiment, the two patterns of FIGS. 5A and 5B are used together—the pattern 500 may be used in the first frame and the pattern 550 may be used in the second frame.

Referring back to FIG. 4, the method of determining motion in an image according to another example embodiment is performed using an image sensor with a sparse mosaic pattern.

At S410, the image sensor acquires pixel data from a first plurality of pixels over a first exposure time (e.g., 10 ms). For example, the image sensor may acquire pixel data from the long exposure pixels $L_{A1}$-$L_{An}$.

At S420, the images sensor acquires pixel data from a second plurality of pixels over a second exposure time (e.g., 1 ms). For example, the image sensor may acquire pixel data from the short exposure pixels $S_{A1}$-$S_{Am}$. As shown in FIG. 5A, the number of the second plurality of pixels is less than a number of the first plurality of pixels.

The first and second exposure times overlap in a single frame. The shorter exposure time may be wholly contained in the longer exposure time. Each frame has two exposure times and two different pixel sets of long exposure pixels and short exposure pixels associated therewith.

At S430, the processor determines any motion using the sparsely allocated pixels based on the acquired pixel data. More specifically, steps S410 and S420 describe steps taken in a first frame to gather pixel data. Thus, S430 includes obtaining pixel data in a second frame to determine any motion. In the second frame, the image sensor may use a mosaic similar to the one used for S410 and S420 except the long exposure pixels become short exposure pixels or the image sensor may use the mosaic 550.

An advantage of using a different pattern between is that motion can be detected by the image sensor in more regions because the two sparse patterns could cover more of the frame's area than just one pattern.

In the case where a similar mosaic is used, the image sensor acquires pixel data from the pixels $L_{A1}$-$L_{An}$ over the second exposure time (short exposure) and the image sensor acquires pixel data from the pixels $S_{A1}$-$S_{Am}$ over the first exposure time (long exposure). As described above, the processor is configured to detect motion by comparing light intensity values (derived from the measured pixel values) from corresponding pixels between the frames.

In the case where the mosaic 550 is used, the image sensor acquires pixel data from the pixels $L_{B1}$-$L_{Bk}$ over the first exposure time and the image sensor acquires pixel data from the pixels $S_{B1}$-$S_{Bj}$ over the second exposure time The processor is configured to detect motion by comparing light intensity values (derived from the measured pixel values) from corresponding pixels between the frames.

This approach allows collection of many images with the same or different exposures. The location of the complementary pixel can be changed from frame to frame. When the final image is combined, complementary pixel data can be excluded from the estimation of the pixel values. Such a sensor is implemented by defining a (smallish) specific set of mosaic patterns and adding relevant controls. Logic is included within the pixel, and additional controls, e.g., horizontal and vertical controls, and "AND" function implemented within the pixel.

The sparsely allocated pixels may be concealed by the image sensor in various ways. For example, after motion estimation is completed, the sparsely allocated pixels can be compensated using a known bad pixel replacement method.

As described above, using the logarithmic response pixel range or a sparse exposure mosaic pattern allows acquisition of high dynamic range images using multiple exposures with mitigation of artifacts associated with content changes during the capture of the multiple frames.

Figure 6:
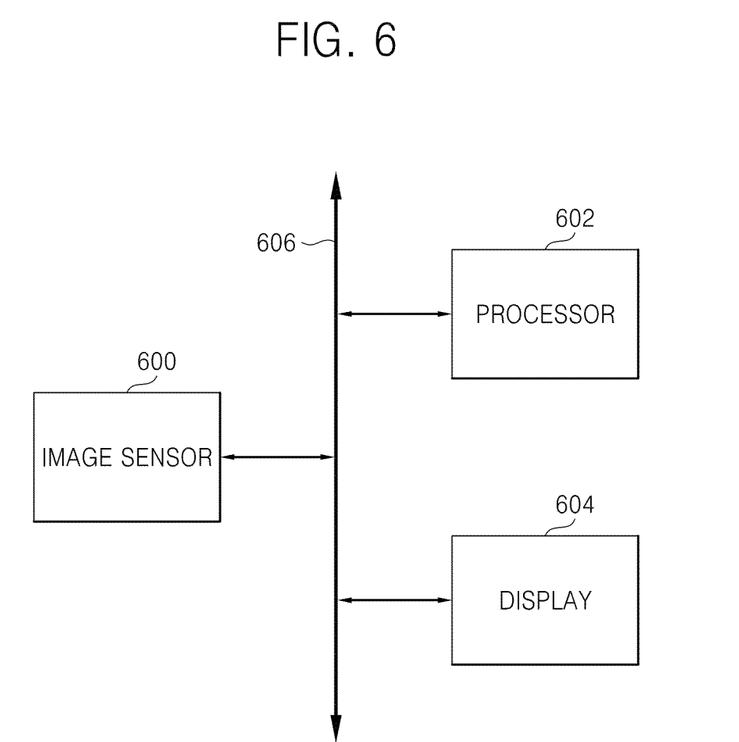
FIG. 6 is a block diagram illustrating a digital imaging system according to an example embodiment.

FIG. 6 is a block diagram illustrating a digital imaging system according to an example embodiment.

Referring to FIG. 6, a processor 602, an image sensor 600, and a display 604 communicate with each other via a bus 606. The processor 602 is configured to execute a program and control the digital imaging system. The image sensor 600 is configured to capture image data by converting optical images into electrical signals. The image sensor 600 may be an image sensor as described above with regard to FIG. 1. The processor 602 may include the image signal processor 108 shown in FIG. 1, and may be configured to process the captured image data for storage in a memory (not shown) and/or display by the display unit 604. The digital imaging system may be connected to an external device (e.g., a personal computer or a network) through an input/output device (not shown) and may exchange data with the external device.

For example, the digital imaging system shown in FIG. 6 may embody various electronic control systems including an image sensor (e.g., a digital camera), and may be used in, for example, mobile phones, personal digital assistants (PDAs), laptop computers, netbooks, tablet computers, MP3 players, navigation devices, household appliances, or any other device utilizing an image sensor or similar device.

When the digital imaging system embodies a mobile phone (e.g., a user equipment), the user equipment may include a camera, an image processing block, a display, a transmitter, a memory, a Central Processing Unit (CPU), a receiver and a data bus that handles communication therebetween.

The camera may sense an image of an object input through a lens and convert the sensed image into a digital image. The image processing block may include a processor that is configured to perform the methods shown in FIGS. 3-4. The display unit may display the processed image to a user under the control of the CPU.

The transmitter and receiver may transmit and receive signals, respectively under the control of the CPU. The transmitter and receiver may include hardware and any necessary software for transmitting and receiving wireless signals, respectively, including, for example, data signals, control signals, and signal strength/quality information via one or more wireless connections to other network elements.

The foregoing description of example embodiments has been provided for purposes of illustration and description. It is not intended to be exhaustive or limiting. Individual elements or features of a particular embodiment are generally not limited to that particular embodiment. Rather, where applicable, individual elements or features are interchangeable and may be used in a selected embodiment, even if not specifically shown or described. The same may also be varied in many ways. All such modifications are intended to be included within the scope of this disclosure.

What is claimed is:

1. A method of determining motion in an image, the method comprising:
    acquiring pixel data from a plurality of pixels in an image sensor, the plurality of pixels having respective response ranges, the response range of at least a first pixel of the pixels including a linear response range and a logarithmic response range, the plurality of pixels configured to produce pixel data according to light of the image in a scene and the response ranges, pixel data of the first pixel having a logarithmic pixel data portion from the logarithmic response range and a linear response pixel data portion from the linear response range; and
    determining the motion by comparing the logarithmic pixel data portion from the logarithmic response range of the first pixel to a linear response pixel data portion from a linear response range of a second pixel of the plurality of pixels.

2. The method of claim 1, wherein the first pixel is associated with a first exposure frame and the second pixel of the pixels is associated with a second exposure frame, the first exposure frame and the second exposure frame being different.

3. The method of claim 2, wherein the first exposure frame is longer than the second exposure frame.

4. The method of claim 2, further comprising:
    combining the pixel data from the first pixel with pixel data from the second pixel based on the determining, the pixel data from the second pixel including the linear response pixel data portion from the linear response range of the second pixel.

5. The method of claim 2, further comprising:
    removing the pixel data from the first pixel based on the determining; and
    determining the image based on the remaining pixel data of the plurality of pixels.

6. An imaging system comprising:
    an image sensor including a plurality of pixels, the image sensor configured to acquire pixel data from the plurality of pixels, the plurality of pixels having respective response ranges, the response range of at least a first pixel of the pixels including a linear response range and a logarithmic response range, the plurality of pixels configured to produce pixel data according to light of an image in a scene and the response ranges, the pixel data of the first pixel having a logarithmic pixel data portion from the logarithmic response range and a linear response data portion from the linear response range; and
    a processor configured to determine motion of the image by comparing the logarithmic pixel data portion from the logarithmic response range of the first pixel to a linear response pixel data portion from a linear response range of a second pixel of the plurality of pixels.

7. The imaging system of claim 6, wherein the first pixel is associated with a first exposure frame and the second pixel of the pixels is associated with a second exposure frame, the first exposure frame and the second exposure frame being different.

8. The imaging system of claim 7, wherein the first exposure frame is longer than the second exposure frame.

9. The imaging system of claim 7, wherein the processor is configured to combine the pixel data from the first pixel with pixel data from the second pixel based on the determined motion, the pixel data from the second pixel including the linear response pixel data portion from the linear response range of the second pixel.

10. The imaging system of claim 7, wherein the processor is configured to remove the pixel data from the first pixel based on the determined motion and determine the image based on the remaining pixel data of the plurality of pixels.

* * * * *